United States Patent
Hsu

(10) Patent No.: US 10,043,165 B2
(45) Date of Patent: Aug. 7, 2018

(54) CLOUD SERVICE INTEGRATION PAY TRADING SYSTEM

(71) Applicant: Yi-Hong Hsu, New Taipei (TW)

(72) Inventor: Yi-Hong Hsu, New Taipei (TW)

(*) Notice: Subject to any disclaimer, the term of this patent is extended or adjusted under 35 U.S.C. 154(b) by 840 days.

(21) Appl. No.: 14/313,770

(22) Filed: Jun. 24, 2014

(65) Prior Publication Data

US 2014/0379564 A1 Dec. 25, 2014

(30) Foreign Application Priority Data

Jun. 25, 2013 (TW) .............................. 102122600 A

(51) Int. Cl.
| G06Q 20/12 | (2012.01) |
|---|---|
| G06Q 20/38 | (2012.01) |
| G06Q 20/40 | (2012.01) |
| G06Q 30/04 | (2012.01) |

(52) U.S. Cl.
CPC ....... *G06Q 20/12* (2013.01); *G06Q 20/38215* (2013.01); *G06Q 20/40* (2013.01); *G06Q 30/04* (2013.01)

(58) Field of Classification Search
None
See application file for complete search history.

(56) References Cited

U.S. PATENT DOCUMENTS

| 8,639,625 B1* | 1/2014 | Ginter ..................... G06F 21/10 705/50 |
|---|---|---|
| 8,839,395 B2* | 9/2014 | Poliashenko ........... G06F 21/41 713/172 |
| 2005/0132229 A1* | 6/2005 | Zhang ................. H04L 12/4641 726/4 |
| 2006/0089912 A1* | 4/2006 | Spagna ................... G06F 21/10 705/51 |

(Continued)

FOREIGN PATENT DOCUMENTS

| TW | 525075 B | 3/2003 |
|---|---|---|
| TW | 201101218 A | 1/2011 |

(Continued)

OTHER PUBLICATIONS

Dimitrios Zissis, D. L. (2010). Future Generation Computer Systems, Addressing cloud computing security issues. Retrieved from University of Eastern Finland: http://www.cs.joensuu.fi/~parkkine/LuK2015/CloudCompSecurity-FutureGenerCompSyst2012.pdf.*

(Continued)

*Primary Examiner* — Steven S Kim
*Assistant Examiner* — El Mehdi Oussir
(74) *Attorney, Agent, or Firm* — Lynette Wylie; Apex Juris, pllc.

(57) ABSTRACT

A cloud service integration pay trading system includes a trust certificate platform, an identity provider platform, at least one user terminal and a cloud platform. Each user terminal can log in the cloud platform to purchase services (Continued)

from the trust certificate platform by using a cloud account being registered in the identity provider platform. When in transaction, the request for consumption from the trust certificate platform is transmitted by the identity provider platform to the cloud platform, allowing the user terminal to use the money flow service of the cloud platform to pay the amount charged.

8 Claims, 3 Drawing Sheets

(56) References Cited

U.S. PATENT DOCUMENTS

| | | | |
|---|---|---|---|
| 2011/0231280 A1* | 9/2011 | Farah | G06Q 10/10 |
| | | | 705/26.8 |
| 2012/0109882 A1* | 5/2012 | Bouse | G06Q 10/10 |
| | | | 707/607 |
| 2013/0024360 A1* | 1/2013 | Ballout | G06Q 20/04 |
| | | | 705/39 |
| 2014/0280966 A1* | 9/2014 | Sapuram | G06Q 30/0631 |
| | | | 709/226 |
| 2014/0379564 A1* | 12/2014 | Hsu | G06Q 20/12 |
| | | | 705/39 |

FOREIGN PATENT DOCUMENTS

| | | | | |
|---|---|---|---|---|
| WO | 2006/066322 A1 | 6/2006 | | |
| WO | WO 2010135412 A2 * | 11/2010 | | H04L 9/085 |
| WO | WO-2010135412 A2 * | 11/2010 | | H04L 9/085 |

OTHER PUBLICATIONS

English Abstract for TW201101218A, Total of 1 page.
English Abstract for TW525075B, Total of 1 page.

* cited by examiner

CLOUD SERVICE INTEGRATION PAY TRADING SYSTEM

BACKGROUND OF THE INVENTION

1. Field of the Invention

The present invention relates to an on-line pay trading system and more particularly, to a cloud service integration pay trading system.

2. Description of the Related Art

According to the known pay trading systems, every user uses the registered membership account to log in the service content of the business operator. Therefore, every user needs to re-register a membership account instead of continuing using existing account for a new service. There are certain platform operators adopt the OpenID system for member identity recognition so that every member can log in quickly and then use the services of other business operators. Due to the lack of using profits-as-incentives, only a small number of large multinational companies are willing to provide free service for leading out logged member to other linked platforms.

In existing pay trading systems, pay trading can simply be performed between the business operator and the cloud platform without allowing their members to lead out their accounts to other business operators. Even if an account provider has the willing of providing their member accounts to other business operators, the account provider can simply get accounts information from the business operator but cannot make any verification to check the correctness of the consumption.

Under the circumstances described above, large scale account providers are not willing to lead their members to the services of other business operators, and business operators cannot get assistance from the account providers to expand their service objects. Thus, a user needs to register for a new account when requesting a different business operator for a service. Having too many accounts will result in unnecessary administrative hassle.

It will create a win-win result if a pay trading system combines account providers in the transaction flow of the cloud service for enabling every party concern to know the accurate consumer split-off amounts, allowing business operators to lead members into their services and helping users to simplify account management.

SUMMARY OF THE INVENTION

The present invention has been accomplished under the circumstances in view. It is one object of the present invention to provide a cloud service integration pay trading system, which allows every user to purchase various cloud service contents using one single cloud account.

It is another object of the present invention to provide a cloud service integration pay trading system, which provides a transaction verification system between each two platforms therein.

It is still another object of the present invention to provide a cloud service integration pay trading system, which enables each platform to share the amount paid by each user terminal subject to a predetermined proportion.

To achieve these and other objects of the present invention, a cloud service integration pay trading system in accordance with the present invention comprises at least one user terminal;

a trust certificate platform, built in a first server for communication with the at least one user terminal through a communication network; The trust certificate platform comprises a cloud service content provider unit, a service account generator unit, a first transaction control unit and a first transaction record database. Wherein, the cloud service content provider unit is adapted for enabling one user terminal to select a cloud service content. The service account generator unit is adapted for generating a service account subject to a cloud account provided by one user terminal, and a verification result. Wherein, the service account is adapted for logging in the trust certificate platform. The first transaction control unit is adapted for enabling one user terminal to perform a transaction process on the cloud service content, generating a first transaction information subject to the transaction process and storing the first transaction information in the first transaction record database;

an identity provider platform built in a second server for communication with the trust certificate platform and the at least one user terminal through the communication network. The identity provider platform comprises a cloud account verification unit, a second transaction control unit and a second transaction record database. Wherein, the cloud account verification unit is adapted for verifying the cloud account inputted by one user terminal, and to generate a verification result. The second transaction control unit is adapted for receiving the first transaction information from the trust certificate platform, and displaying the first transaction information and an identity information for enabling the user terminal to perform a confirmation process and to further generate a first confirmation result, combining the first transaction information and the first confirmation result to generate a second transaction information, storing the second transaction information in the second transaction record database and, transmitting the first confirmation result to the trust certificate platform; and a cloud platform built in a third server for communication with the trust certificate platform, the identity provider platform and the at least one user terminal through the communication network. The cloud platform comprises a cloud service content selection unit, a transaction payment unit, a third transaction control unit and a third transaction record database. Wherein, the cloud service content selection unit is adapted for enabling one user terminal to select a cloud service content. The transaction payment unit is adapted for enabling one user terminal to perform a financial payment process and to further generate a third transaction information. The financial payment process is performed in accordance with the second transaction information. The third transaction information comprises a financial payment information and a second confirmation result. The third transaction control unit is adapted for receiving the second transaction information from the identity provider platform, storing the third transaction information in the third transaction record database and, transmitting the second confirmation result to the trust certificate platform and the identity provider platform.

Preferably, the cloud service content is selected from the group of games, social communication, life information, videos, online shopping, online information and music.

Preferably, the first transaction record database, the second transaction record database and the third transaction record database are adapted for storing the transaction information of identity, bill number, time, item, amount and payment status for profit sharing and reconciliation.

Preferably, the identity provider platform and the trust certificate platform, or the cloud platform and the trust certificate platform based on the cooperation relationship share the amount paid by each user terminal subject to a predetermined proportion.

Preferably, the identity provider platform and the cloud platform share the amount paid by each user terminal subject to a predetermined proportion.

Preferably, the trust certificate platform and the cloud platform share the amount paid by each user terminal subject to a predetermined proportion.

Preferably, the identity provider platform, the trust certificate platform and the cloud platform share the amount paid by each user terminal subject to a predetermined proportion.

Preferably, the payment service provided by the cloud platform is selected from the group of reward points exchange, online credit card payment, online ATM, mobile phone micropayment, convenience store collection and account remittance.

Other advantages and features of the present invention will be fully understood by reference to the following specification in conjunction with the accompanying drawings, in which like reference signs denote like components of structure.

DETAILED DESCRIPTION OF THE PREFERRED EMBODIMENT

Figure 1:
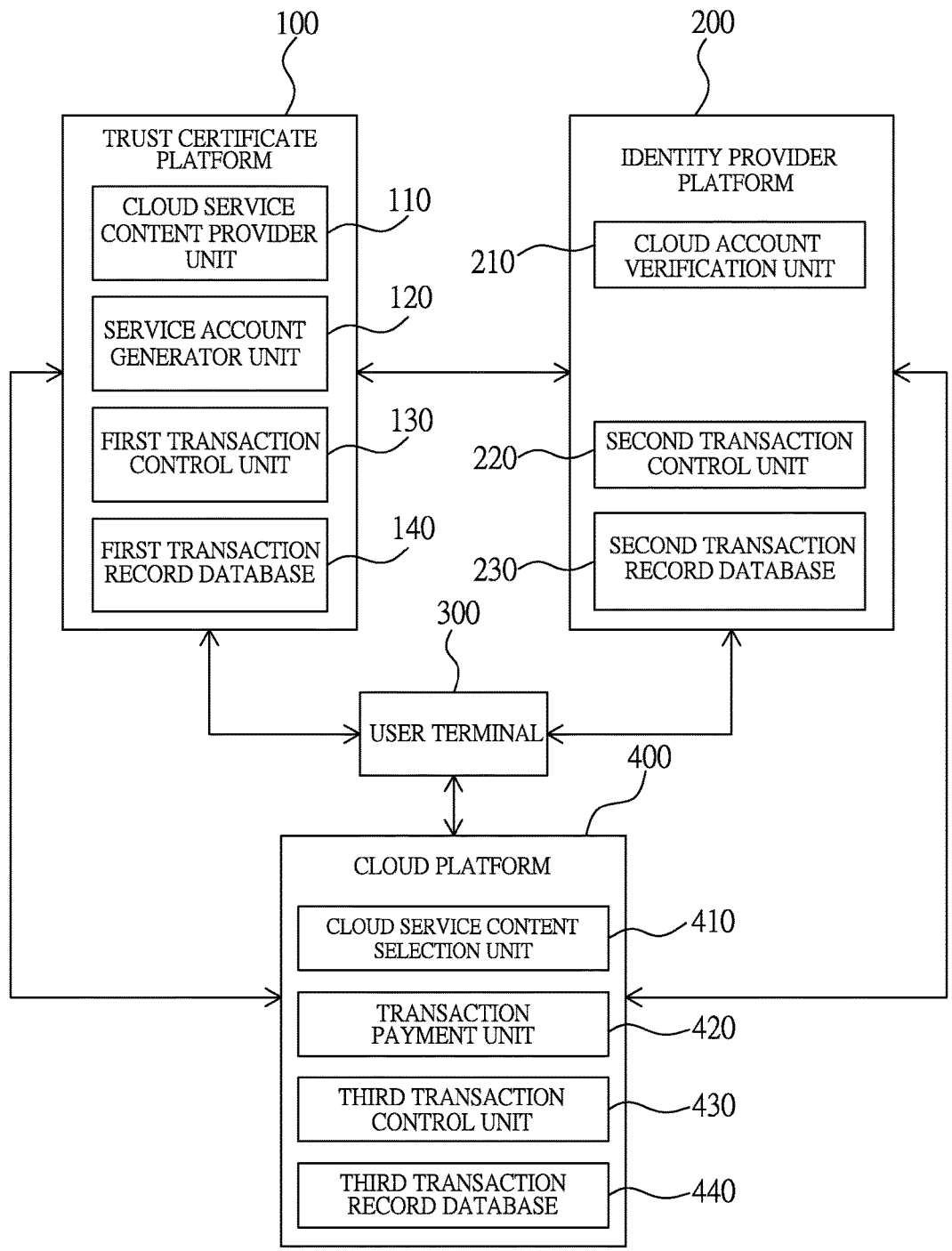
FIG. 1 is a system block diagram of a cloud service integration pay trading system in accordance with the present invention.

Referring to FIG. 1, the technical spirit of a cloud service integration pay trading system in accordance with the present invention is as follows:

(1) Provide a cloud account registration system: that allows a user to log in a trust certificate platform with a certified ID obtained from an identity provider platform and to use a cloud service content provided by the trust certificate platform without re-registration.

(2) Put the identity provider platform in a trading payment system: so that when a user uses a cloud account provided by the identity provider platform to consume in a cloud service content provider unit of the trust certificate platform, the system will transmit the transaction request to the identity provider platform and direct to a money flow service in a cloud platform after the user confirms the consumer information, ensuring that the identity provider platform can get the correct amount of consumption and eventually share the profit.

(3) Provide a trading identity verification system: that uses the code of the certificate being transmitted to the identity provider platform to reversely look up the user's original account and then displays the user's original account for enabling the user to confirm whether or not to start the transaction using the identify registered in the identity provider platform, and then checks the correctness of the transaction contents of transaction number, time, items, amount and status.

Based on the technical spirit described above, the invention provides a cloud service integration pay trading system, as illustrated in FIG. 1. As illustrated in the system block diagram of FIG. 1, the cloud service integration pay trading system comprises a trust certificate platform 100, an identity provider platform 200, at least one user terminal 300, and a cloud platform 400.

The trust certificate platform 100 is built in a first server for communication with the identity provider platform 200, the at least one user terminal 300 and the cloud platform 400 through a communication network. It is a business operator that provides cloud service contents, comprising a cloud service content provider unit 110, a service account generator unit 120, a first transaction control unit 130, and a first transaction record database 140. The cloud service content means the services and information provided by the trust certificate platform 100 to the user terminal 300, such as, life information, online education, videos, music, games, shopping, social communication, . . . and etc.

The service account generator unit 120 is adapted for generating a service account for logging in the trust certificate platform 100 subject to a cloud account provided by the user terminal 300 and the verification result of the identity provider platform 200.

The first transaction control unit 130 is adapted for enabling one user terminal 300 to perform a transaction process on the cloud service content, generating a first transaction information subject to the transaction process, transmitting the generated first transaction information to the identity provider platform 200, and storing the first transaction information in the first transaction record database 140, wherein the first transaction information contains the cloud service content, the transaction item, the transaction mode, and the indentify information corresponding to the cloud account.

The first transaction record database 140 is adapted for recording the transaction information including the identity, bill number, time, item, amount and payment status for further inquiry and reconciliation.

The identity provider platform 200 is built in a second server for communication with the trust certificate platform 100, the user terminal 300 and the cloud platform 400 through the aforesaid communication network. The identity provider platform 200 comprises a cloud account verification unit 210, a second transaction control unit 220, and a second transaction record database 230.

The cloud account verification unit 210 is adapted for verifying the cloud account inputted through the user terminal 300 so as to generate the aforesaid verification result.

The second transaction control unit 220 is adapted for receiving the first transaction information from the trust certificate platform 100, displaying the first transaction information and the identity information so that the user terminal 300 can start a confirmation process to generate a first confirmation result (transaction confirmed or not confirmed), combining the first transaction information and the first confirmation result to generate a second transaction information, storing the second transaction information in the second transaction record database 230, and transmitting the first confirmation result to the trust certificate platform 100.

The second transaction record database 230 is adapted for recording the transaction information including identity, bill number, time, item, amount and status for further inquiry and reconciliation.

The user terminal 300 is the user end that can log in the cloud service content using the cloud account, and to pay the bill through the cloud platform 400.

The cloud platform 400 is built in a third server for communication with the trust certificate platform 100, the identity provider platform 200 and the user terminal 300 through the aforesaid communication network. The cloud platform 400 comprises a cloud service content selection unit 410, a transaction payment unit 420, a third transaction control unit 430, and a third transaction record database 440.

The cloud service content selection unit 410 is adapted for anyone of the at least one user terminal 300 to select the desired cloud service contents. In order to promote the cloud service content, the trust certificate platform 100 will put the cloud service contents in the cloud platform 400, enabling more user terminals 300 to contact the cloud service contents of the trust certificate platform 100.

The transaction payment unit 420 is adapted for anyone of the at least one user terminal 300 to start a financial payment process so as to generate a third transaction information, wherein the financial payment process is performed subject to the second transaction information; the third transaction information includes a financial payment information and a second confirmation result (paid or not paid). Further, the transaction payment unit 420 can provide payment services, such as reward points exchange, online credit card payment, online ATM, mobile phone micropayment, convenience store collection and, account remittance.

The third transaction control unit 430 is adapted for receiving the second transaction information from the identity provider platform 200, storing the third transaction information in the third transaction record database 440, and transmitting the second confirmation result to the trust certificate platform 100 and the identity provider platform 200.

The third transaction record database 440 is adapted for recording the transaction information of identity, bill number, time, item, amount and payment status for further inquiry and reconciliation.

Figure 2:
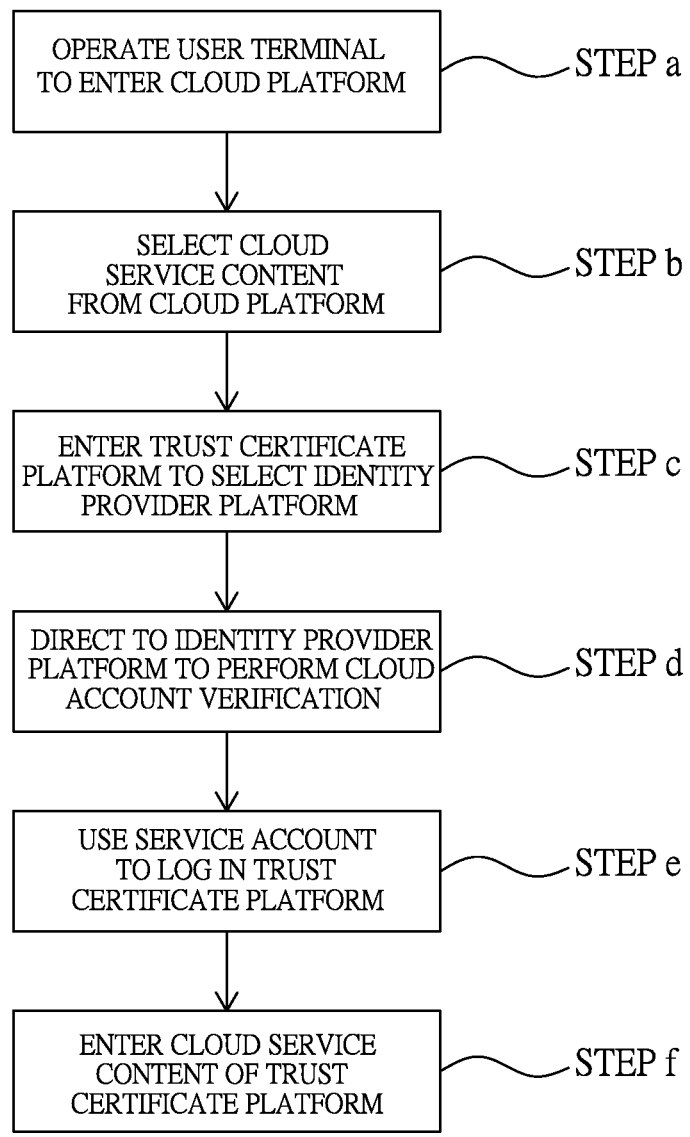
FIG. 2 is an account login flow chart of the cloud service integration pay trading system in accordance with the present invention.

Referring to FIG. 2, the cloud service integration pay trading system further comprises an account login procedure. This account login procedure comprises the steps of: operating one user terminal to enter the cloud platform (step a); selecting a cloud service content from the cloud platform (step b); entering the trust certificate platform to select the identity provider platform (step c); directing to the identity provider platform to perform cloud account verification (step d); using a service account to log in the trust certificate platform (step e); and entering the cloud service content of the trust certificate platform (step f).

In the operation, for example, the user terminal 300 selects the desired cloud service content S from the cloud platform 400, and uses one cloud account A provided by the identity provider platform 200 to log in the trust certificate platform 100, and then requests the identity provider platform 200 for identity verification. At this time, the user terminal 300 provides account number, password and/or other necessary identity verification information for identity verification. When passed the identity verification, the cloud account verification unit 210 provides a certificate code B to the trust certificate platform 100. If not passed, the identity provider platform 200 provides a message of "verification failed" to the trust certificate platform 100. If the trust certificate platform 100 viewed there is a service account C in conformity with the certificate code B, the service is provided to the service account C. If there is no service account in conformity with the certificate code B, the service account generator unit 120 automatically generates a service account C for the user terminal 300 to mate the certificate code B. To the trust certificate platform 100, the certificate code B can be mapped to the service account C. To the identity provider platform 200, the certificate code B can be mapped to the cloud account A.

Figure 3:
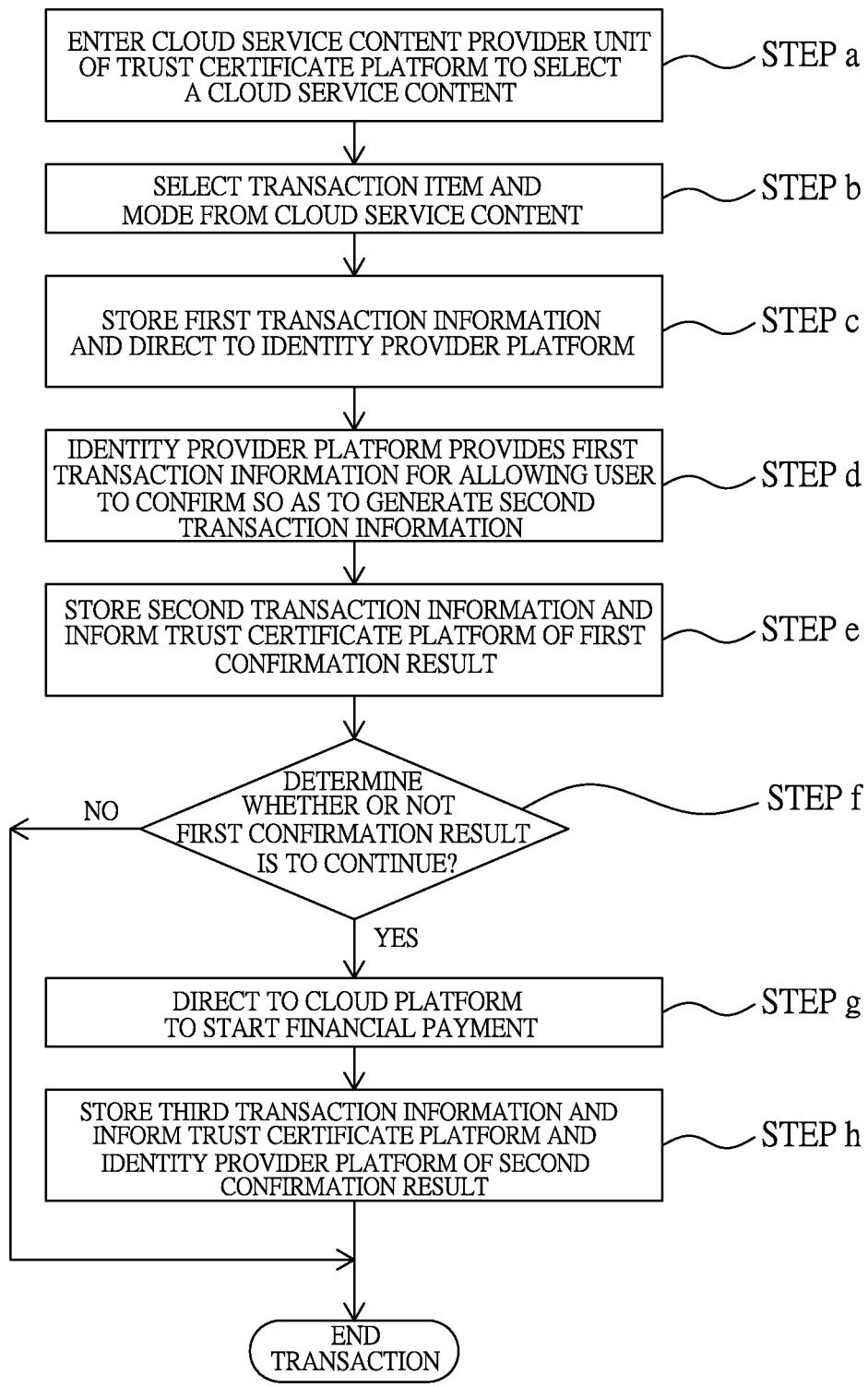
FIG. 3 is a transaction payment flow chart of the cloud service integration pay trading system in accordance with the present invention.

Referring to FIG. 3, the cloud service integration pay trading system further comprises a transaction payment procedure. This transaction payment procedure comprises the steps of: entering the cloud service content provider unit of the trust certificate platform to select a cloud service content (step a); selecting transaction item and mode from the cloud service content (step b); storing a first transaction information and directing to the identity provider platform (step c); the identity provider platform providing the first transaction information for allowing the user to confirm so as to generate a second transaction information (step d); storing the second transaction information and informing the trust certificate platform of the first confirmation result (step e); determining whether or not the first confirmation result is to continue? (step f); directing to the cloud platform to start financial payment (step g); and storing a third transaction information and informing the trust certificate platform and the identity provider platform of the second confirmation result (step h).

In the operation, for example, the user terminal 300 uses a service account C to log in the trust certificate platform 100, and then to consume in the cloud service content S provided by the cloud service content provider unit 110. At this time, the user terminal 300 selects from the menu the desired object of transaction, quantity and payment mode. Thereafter, the first transaction information composed of the cloud service content with the transaction location, the transaction item, the transaction mode and the identity information of the cloud account, such as certificate code, is then transmitted to the identity provider platform 200, and the first transaction information will then be recorded in the first transaction record database 140.

After received the certificate code B of the identity information of the first transaction information, the identity provider platform 200 checks the corresponding cloud account A and displays the identity of this cloud account A and the related transaction information for enabling the user terminal 300 to confirm the transaction content, and then reports the first confirmation result (the user terminal 300 decided to continues or not to continue the transaction) to the trust certificate platform 100. Because only the identity provider platform 200 and the user terminal 300 can know the registered identity of the cloud account A, this transaction confirmation process cannot be forged, ensuring that the identity provider platform 200 can get the accurate amount of consumption of the user terminal 300 for billing. After finished the confirmation process, the first confirmation result and the second transaction information are transmitted to the cloud platform 400 and stored in the second transaction record database 230.

The cloud platform 400 provides a corresponding financial payment procedure to the user terminal 300 subject to the received second transaction information. If the money flow is checked to be correct, the amount will be charged according to the financial payment mode. If the verification failed, the amount will not be charged. Wherein, the second confirmation result, such as payment completed, insufficient balance, account canceled and/or wait timeout, and the financial payment information, such as transaction successes, will be contained in the third transaction information and stored in the third transaction record database 440. The cloud platform 400 will also transmit the second confirmation result to the trust certificate platform 100 and the identity provider platform 200 for updating the transaction data in the first transaction record database 140 and the second transaction record database 230.

When the user terminal 300 finished the financial payment, the transaction amount will be eventually transmitted to the account of the money flow operator in the cloud platform 400. The cloud platform 400 deducts its deserved portion from the transaction amount in accordance with the agreed checkout payment mode, and then hand over the balance to the trust certificate platform 100, enabling the trust certificate platform 100 to pay to the identity provider platform 200 the proportion the identity provider platform 200 deserved. For example, the trust certificate platform 100 made a contract with the identity provider platform 200 and the cloud platform 400, allowing each of them to get 30 percent. Thus, when one user consumed 100 dollars in one cloud service content, the cloud platform 400 will take 30 percent (30 dollars) at first and hand over the rest 70 dollars to the trust certificate platform 100, enabling the trust certificate platform 100 to hand over another 30 percent of the 100 dollars (30 dollars) to the identity provider platform 200. Thus, the trust certificate platform 100 can keep 40 percent of the 100 dollars (40 dollars).

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A cloud service integration pay trading system, comprising:
   at least one user terminal allowing a user to enter information into a computer or receiving information from it;
   a trust certificate platform, said trust certificate platform implemented in a first server for communication via data transmission with said at least one user terminal through a communication network, said trust certificate platform having a cloud service content provider unit, a service account generator unit, a first transaction control unit and a first transaction record database, wherein said cloud service content provider unit allows said at least one user terminal to select a cloud service content, said service account generator unit generates a service account subject to a cloud account provided by said at least one user terminal and a verification result, wherein said service account is used for logging in said trust certificate platform, said first transaction control unit allows said at least one user terminal to perform a transaction process on said cloud service content, which generates a first transaction information subject to said transaction process, and stores said first transaction information in said first transaction record database;
   an identity provider platform, said identity provide platform implemented in a second server for communication via data transmission with said trust certificate platform and said at least one user terminal through said communication network, said identity provider platform having a cloud account verification unit, a second transaction control unit and a second transaction record database, wherein said cloud account verification unit verifies the cloud account inputted by said at least one user terminal and generates a verification result, and said second transaction control unit receives said first transaction information from said trust certificate platform and displays said first transaction information and an identity information which allows said at least one user terminal to perform a confirmation process and to further generate a first confirmation result, combining said first transaction information and said first confirmation result to generate a second transaction information, store said second transaction information in said second transaction record database and, transmit said first confirmation result to said trust certificate platform; and
   a cloud platform, said cloud platform implemented in a third server for communication via data transmission with said trust certificate platform, said identity provider platform and said at least one user terminal through said communication network, said cloud platform having a cloud service content selection unit, a transaction payment unit, a third transaction control unit and a third transaction record database, wherein said cloud service content selection unit allows said at least one user terminal to select a cloud service content, said transaction payment unit allows said at least one user terminal to perform a financial payment process and to further generate a third transaction information, wherein said financial payment process being performed in accordance with said second transaction information, and said third transaction information having a financial payment information and a second confirmation result, said third transaction control unit receives said second transaction information from said identity provider platform, stores said third transaction information in said third transaction record database and, transmits said second confirmation result to said trust certificate platform and said identity provider platform;
   wherein the pay trading system allows the user to log in the trust certificate platform with a certified ID obtained from the identity provider platform and to use the cloud service content provided by the trust certificate platform without re-registration; and
   wherein the pay trading system allows each platform to share the amount paid by the user terminal subject to a predetermined proportion.

2. The cloud service integration pay trading system as claimed in claim 1, wherein said cloud service content is selected from the group of games, social communication, life information, videos, online shopping, online education and music.

3. The cloud service integration pay trading system as claimed in claim 1, wherein said first transaction record database, said second transaction record database and said third transaction record database store the transaction information of identity, bill number, time, item, amount and payment status for profit sharing and reconciliation.

4. The cloud service integration pay trading system as claimed in claim 1, wherein said identity provider platform and said trust certificate platform share the amount paid by each said user terminal subject to a predetermined proportion.

5. The cloud service integration pay trading system as claimed in claim 1, wherein said identity provider platform and said cloud platform share the amount paid by each said user terminal subject to a predetermined proportion.

6. The cloud service integration pay trading system as claimed in claim 1, wherein said trust certificate platform and said cloud platform share the amount paid by each said user terminal subject to a predetermined proportion.

7. The cloud service integration pay trading system as claimed in claim 1, wherein said identity provider platform, said trust certificate platform and said cloud platform share the amount paid by each said user terminal subject to a predetermined proportion.

8. The cloud service integration pay trading system as claimed in claim 1, wherein the payment service provided by said cloud platform is selected from the group of reward points exchange, online credit card payment, online ATM, mobile phone micropayment, convenience store collection and account remittance.

\* \* \* \* \*